June 9, 1936.  S. E. SHEPPARD ET AL  2,043,906
MATTE SURFACE AND METHOD OF PRODUCING THE SAME
Filed March 22, 1935
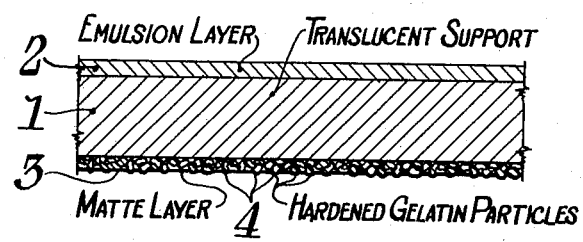
Samuel E. Sheppard &
James H. Hudson,
Inventors

UNITED STATES PATENT OFFICE 2,043,906

MATTE SURFACE AND METHOD OF PRODUCING THE SAME

Samuel E. Sheppard and James H. Hudson, Rochester, N. Y., assignors to Eastman Kodak Company, Rochester, N. Y., a corporation of New York Application March 22, 1935, Serial No. 12,473

18 Claims. (Cl. 91—69)

The present invention relates to an improvement in matte surfaces and a method of producing the same and more particularly to such a method and product as applied to photographic use.

The production of a matte surface having light diffusing characteristics and having sufficient tooth for retouching is often desirable in the photographic art. Such a matte surface is an important factor in establishing distinct types and grades of photographic material. For instance, a matte surface imparts a ground glass effect to negatives which are examined by transmitted light, either for X-ray or portrait work. In addition, the matte backing may provide a rough surface of sufficient tooth to permit retouching with a pencil or crayon.

The primary object of the present invention is the provision on a photographic element of a matte surface which contains finely divided hardened gelatin particles.

Another object of the invention is the provision of a method for treating gelatin particles to harden and further divide the same so that said particles constitute an appropriate filler for a matte layer.

A further object of the invention is the treatment of finely divided gelatin particles to harden and reduce the size of said particles, which treatment at the same time partially dissolves some of the gelatin so that the dissolved gelatin may act as an agglutinant for the hardened gelatin particles.

Still another object of the invention is the addition to a gelatin suspension in a volatile solution of spirit soluble gums or alcohol soluble proteins which may function upon evaporation of the solution to secure the hardened gelatin particles to a support.

A still further object of the invention is the provision of a method for producing a filler of finely divided and hardened gelatin particles by leaching out the volatile solvent to produce a very fine powder of gelatin.

Other and further objects of the invention will be suggested to those skilled in the art by the description which follows.

The aforementioned objects of the invention are attained by a method of providing a matte surface on a translucent or photographic support, which comprises treating a finely divided gelatin suspension in a volatile solution containing formaldehyde, this gelatin suspension is ground in a ball or pebble mill for a predetermined time. The resultant composition is then applied to a suitable support and upon evaporation of the volatile solvent an adherent and cohesive matte layer containing finely divided and hardened gelatin particles is produced. This matte layer has diffusing properties similar to ground glass and a tooth which permits retouching. The adhesion of the gelatin particles to the support may be improved and the texture of the matte surface may be modified by the addition of spirit soluble gums or alkali soluble proteins to the gelatin suspension before coating.

Reference is hereby made to the accompanying drawing, the single figure of which illustrates in cross-section to an enlarged scale a portion of a photographic element provided with a matte layer according to the invention.

The method and product of our invention are to be described with respect to their use in providing a matte surface for a photographic element but it is to be understood that said method and resulting layer with a matte surface may be used to equal advantage in other arts requiring the provision of a matte surface with good tooth.

The photographic element includes a translucent support 1 which may be composed of glass or a cellulose derivative and may or may not include an emulsion layer 2 on one surface of the support 1. The support 1 will be transparent when composed of good quality glass or good quality cellulose derivative. However, the present invention contemplates the provision of a matte layer upon a support which merely transmits light. Hence, the term "translucent" is used in a comprehensive sense throughout the specification and appended claims as descriptive of supports which will transmit light whether transparent or not.

A matte layer 3 is then applied to the other surface of support 1 and is of the general well-known type which consists of a finely divided filler applied to the support by a suitable vehicle. According to the prior art, fillers such as barium sulfate and ground glass have previously produced satisfactory results. In many instances the vehicle for supporting the filler is stated to be a film of gelatin. The outstanding feature of the present invention is that the finely divided and hardened particles 4 constituting the filler are composed of gelatin which may be secured to the support by previously dissolved gelatin or by other agglutinants to be later specified.

The invention is best performed by first preparing a gelatin suspension which is applied in a thin layer to the support and which upon evaporation produces a matte layer of good quality. A preferred procedure for preparing said gelatin suspension is described immediately hereafter but is included only by way of example and does not in any way limit the variations of the invention.

A finely divided gelatin, such as gelatin powder or spray dried gelatin, is immersed in a solution of alcohol and formaldehyde. The alcohol is preferably 95% alcohol and may contain from ½ to 2% of formaldehyde. The quantity of gelatin added is about 10% by weight. This gelatin suspension is then ground in a ball or pebble mill for a predetermined time. The time of treatment or grinding depends partly upon the character of the original gelatin and partly upon the texture of the matte surface desired. It has been found that grinding or treatment in the mill from 12 to 14 hours will produce a good matte effect in the resultant layer. Generally the grinding is continued until the rate of sedimentation of the hardened gelatin particles is about ⅛ of an inch per hour. The ground gelatin suspension is applied in any suitable or wellknown manner in a thin layer to a translucent support such as a film base, a glass plate, or a dried gelatin surface. The fluid spreads uniformly and drys rapidly to form a layer which is adherent, cohesive, and resistant to friction. The resulting layer is not readily friable and pulverulent, as might be expected at first, and has good light diffusing properties and sufficient tooth for retouching by pencil or crayon.

The good quality of the matte layer thus formed suggests that the alcohol contains a small quantity of dissolved or degraded gelatin which acts as an agglutinant for securing adhesion of the hardened gelatin particles to the support. However, this speculation as to the cause of the improved characteristics of the layers is in no way controlling.

Also, it has been found possible to secure greater protection for the hardened or formalinized gelatin particles and to modify the texture of the matte surface by the addition to the gelatin suspension of small amounts of other agglutinants. Such substances or agglutinants may be spirit soluble gums, such as shellac, alcohol soluble proteins such as casein, albumen, zein, gliadine, and/or alkaline breakdown products which are rendered sufficiently alcohol soluble. The volatile solvent such as alcohol at least has a swelling action upon the materials proposed as alternative agglutinants.

Since the alcohol suspension of the gelatin after milling, even without the addition of said other agglutinants, binds together on drying in the form previously mentioned, it does not by direct drying yield a powder of comparable fine division with that of the alcohol suspension. It has been found, however, that by leaching out the alcohol with benzene or gasoline and then drying that a very fine powder of gelatin is formed. For example, this very fine gelatin powder may be resuspended in aqueous gelatin and coated by chilling and drying in the usual way. Such coatings have less diffusing power than those out of alcohol.

As a solvent or vehicle of the gelatin suspension, ethyl alcohol is preferred; however, methyl alcohol or acetone may be used during grinding and it is even possible to use benzole for this purpose.

The gelatin suspension may be coated upon the support to form a dried layer with matte characteristic or may be marketed as a colloidal solution with suspension to be applied to any support requiring a layer with a matte surface. The matte surfaced layer may be used for any of the purposes in the photographic art which were previously mentioned and has in addition been found useful for application to glossy prints to provide thereon a matte surface which will take oil colors.

The scope of the invention includes any of the variations or combinations of ingredients stated or suggested herein and is limited only by the appended claims.

Having now particularly described our invention what we desire to secure by Letters Patent of the United States and what we claim is:

1. The method of providing a matte surface on a support, which comprises treating a finely divided gelatin with a volatile solution containing formaldehyde, forming a thin layer of solution and hardened formalinized gelatin particles on said support, and drying said layer so that said hardened gelatin particles form a matte surface on said support.

2. The method of providing a matte surface on a support, which comprises treating a finely divided gelatin with a volatile solution containing formaldehyde and a volatile diluent, whereby the gelatin particles are formalinized and a small quantity of gelatin is dissolved, applying to said support a film of the solution, and drying said film so that the hardened formalinized gelatin particles are secured by the dissolved gelatin to the support and to provide a matte surface thereon.

3. The method of providing a matte surface on a support, which comprises treating a finely divided gelatin with a volatile solution containing formaldehyde and alcohol, whereby the gelatin particles are hardened and partially dissolved, applying to said support a film of the solution, and drying said film whereby the dissolved gelatin acts as an agglutinant for securing the hardened gelatin particles to the support to form a matte surface thereon.

4. The method of providing a matte surface on a translucent support, which comprises grinding gelatin particles in a solution of formaldehyde and a volatile partial solvent for the gelatin particles, whereby a small quantity of the gelatin is dissolved and the remaining particles are hardened, applying to said support a film of the solution, and drying said film to form a matte surface of hardened gelatin particles which are secured to said support by the gelatin which was dissolved.

5. The method of providing a matte surface on a translucent support, which comprises suspending gelatin particles in a solution of formaldehyde and a volatile solvent, grinding the gelatin suspension to formalize and reduce the size of said gelatin particles and for a predetermined time, applying to said support a film of the solvent and hardened gelatin particles, and drying said film to form a matte surface of hardened gelatin particles, the texture of said matte surface corresponding to the length of time of grinding of the gelatin particles.

6. The method of providing a matte surface on a translucent support, which comprises suspending gelatin particles in a solution of formaldehyde and alcohol, grinding the gelatin suspension to formalinize and partially to dissolve and reduce the size of the gelatin particles and for a predetermined time, applying to said support a film of the solvent and hardened gelatin particles, and drying said film to form a matte layer of hardened gelatin particles secured to said support by the previously dissolved gelatin, the texture and adhesion of said matte surface corresponding to the length of time of grinding of the gelatin particles.

7. The method of providing a matte surface on a translucent support, which comprises preparing a solution of alcohol containing ½–2 percent formaldehyde, adding to said solution about ten percent by weight of finely divided gelatin, grinding the solution to formalinize and partially to dissolve and reduce the size of the gelatin particles and until the rate of sedimentation of the gelatin particles is about an eighth of an inch per hour, applying to said support a film of the solution containing the hardened gelatin particles, and drying said film to form a matte layer of hardened gelatin particles secured to the support by the previously dissolved gelatin.

8. The method of providing a matte surface on a translucent support, which comprises treating finely divided gelatin with a volatile solution containing formaldehyde, adding to the solution a small quantity of an agglutinant, applying a thin layer of the solution to said support, and drying said layer whereby the formalinized gelatin particles are fastened to said support by said agglutinant and may be partially covered thereby.

9. The method of providing a matte surface on a translucent support, which comprises treating finely divided gelatin with a volatile solution containing formaldehyde, adding to the solution a small quantity of an agglutinant such as a spirit soluble gum, applying a thin layer of the solution to said support, and drying said layer whereby the formalinized and hardened gelatin particles are fastened to said support and are partially covered by said agglutinant.

10. The method of providing a matte surface on a translucent support, which comprises treating finely divided gelatin with a volatile solution containing formaldehyde, adding to the solution a small quantity of an agglutinant such as an alcohol soluble protein, selected from the group of casein, albumen, zein, and gliadine, applying a thin layer of the solution to said support, and drying said layer whereby the formalinized and hardened gelatin particles are fastened to said support and are partially covered by said agglutinant.

11. The method of making a filler of hardened but finely divided gelatin particles for a matte layer which comprises grinding powdered gelatin with a volatile solution containing formaldehyde to a predetermined fineness, leaching out the volatile solution with a volatile liquid hydrocarbon, and evaporating the leaching liquid to obtain hardened and very finely divided gelatin particles.

12. As an article of manufacture, a photographic element comprising a translucent support, and a matte layer on said support and containing a filler of finely divided and hardened gelatin particles.

13. As an article of manufacture, a photographic element comprising a translucent support, and a matte layer on said support and including finely divided and hardened gelatin particles which are fastened to said support by dissolved or degraded gelatin.

14. As an article of manufacture, a photographic element comprising a translucent support, a layer of gelatin on said support, and a plurality of finely divided hardened gelatin particles embedded in said gelatin layer for imparting a matte characteristic thereto.

15. As an article of manufacture, a photographic element comprising a translucent support, and a matte layer on said support including a plurality of finely divided hardened gelatin particles and an agglutinant for fastening said particles to said support.

16. As an article of manufacture, a photographic element comprising a translucent support, and a matte layer on said support including a plurality of finely divided hardened gelatin particles and including a spirit soluble gum for securing said particles to said support.

17. As an article of manufacture, a photographic element comprising a translucent support, and a matte layer on said support including a plurality of finely divided hardened gelatin particles and including an alcohol soluble protein for securing said particles to said support.

18. A composition of matter for application to a support to form a matte layer thereon, comprising a solution of a volatile solvent and formaldehyde, and a plurality of finely divided formalinized gelatin particles suspended in said solution.

SAMUEL E. SHEPPARD.
JAMES H. HUDSON.